US008379560B2

(12) United States Patent
Kessleman et al.

(10) Patent No.: US 8,379,560 B2
(45) Date of Patent: Feb. 19, 2013

(54) TECHNIQUES ENABLING NEIGHBOR LOCATION DISCOVERY FOR MMWAVE WPAN WITH AN OUT OF BAND CONTROL CHANNEL

(75) Inventors: Alex Kessleman, Haifa (IL); Guoqing Li, Portland, OR (US)

(73) Assignee: Intel Corporation, Santa Clara, CA (US)

(*) Notice: Subject to any disclaimer, the term of this patent is extended or adjusted under 35 U.S.C. 154(b) by 675 days.

(21) Appl. No.: 12/044,132

(22) Filed: Mar. 7, 2008

(65) Prior Publication Data
US 2009/0225730 A1 Sep. 10, 2009

(51) Int. Cl.
H04W 4/00 (2009.01)
(52) U.S. Cl. ........ 370/314; 370/337; 370/347; 370/442; 370/447; 370/458; 370/462; 370/500; 370/524
(58) Field of Classification Search .............. 370/312, 370/314, 329, 337, 347, 350, 442, 447, 458, 370/461, 462, 500, 524
See application file for complete search history.

(56) References Cited

U.S. PATENT DOCUMENTS

| 6,925,064 | B2* | 8/2005 | Hester et al. ................. 370/255 |
| 2005/0002362 | A1* | 1/2005 | Kim et al. .................... 370/336 |
| 2006/0030290 | A1* | 2/2006 | Rudolf et al. ............... 455/404.1 |
| 2006/0073850 | A1 | 4/2006 | Cha et al. |
| 2007/0184779 | A1 | 8/2007 | Park et al. |
| 2007/0287384 | A1* | 12/2007 | Sadri et al. .................. 455/63.4 |
| 2008/0242373 | A1* | 10/2008 | Lu et al. ..................... 455/575.1 |
| 2008/0253328 | A1* | 10/2008 | Sahinoglu et al. ............ 370/330 |
| 2010/0142460 | A1* | 6/2010 | Zhai et al. .................... 370/329 |

FOREIGN PATENT DOCUMENTS

| JP | 2005176356 | | 2/2004 |
| JP | 2005039728 | | 2/2005 |
| JP | 2007526655 | | 9/2007 |
| WO | 2004100503 | A2 | 11/2004 |
| WO | 2007114804 | A1 | 10/2007 |
| WO | 2007146733 | A1 | 12/2007 |
| WO | 2009/114269 | A2 | 9/2009 |
| WO | 2009/114269 | A3 | 11/2009 |

OTHER PUBLICATIONS

International Preliminary Report on Patentability received for PCT Patent Application No. PCT/US2009/035063, mailed on Sep. 16, 2010, 6 pages.
International Search Report/ Written Opinion received for PCT Patent Application No. PCT/US2009/035063, Mailed on Sep. 30, 2009, pp. 11.
Office Action received for United Kingdom Patent Application 1012364.4 , mailed on Jan. 3, 2012, 3 pages.

(Continued)

Primary Examiner — Bo Hui A Zhu
(74) Attorney, Agent, or Firm — Thorpe North & Western, LLP

(57) ABSTRACT

An embodiment of the present invention provides a method of neighbor discovery in a wireless personal area network, comprising coordinating communications in the WPAN by a WPAN coordinator, and transmitting beacons by the WPAN coordinator on a control channel of the WPAN that specifies the time slots and the order in which devices operating in the WPAN transmit their omni-directional training sequences on a data channel at the beginning of the next super-frame.

10 Claims, 1 Drawing Sheet

OTHER PUBLICATIONS

Office Action received for Japanese Patent Application 2010-545286, mailed on May 8, 2012, 9 pages of Office Action, including 5 pages of English translation.

Office Action received for Japanese Patent Application 2010-545286, mailed on Sep. 4, 2012, 3 pages of Office Action, including 5 pages of English translation.

* cited by examiner

TECHNIQUES ENABLING NEIGHBOR LOCATION DISCOVERY FOR MMWAVE WPAN WITH AN OUT OF BAND CONTROL CHANNEL

BACKGROUND

The availability of 7 GHz of unlicensed spectrum in the 60 GHz band offers the potential for multi-Gigabit indoor wireless personal area networking (WPAN). Applications that require large bandwidth include uncompressed High Definition (HD) video streaming, fast file download from an airport kiosk (Sync & Go) and wireless display and docking, to name just a few. These applications cannot be supported over existing home networking solutions (IEEE 802.11 a/b/g/n and WiMedia UWB) because the required data rates far exceed the capabilities of these networks.

A millimeter wave (mmwave) communication link is less robust than those at lower frequencies (e.g. 2.4 GHz and 5 GHz bands) because of its inherent isolation due to both oxygen absorption, which attenuates the signal over long range, and its short wavelength, which provides high attenuation through obstructions such as walls and ceilings. Thus, one of the biggest challenges for designing a high data rate radio system for the 60 GHz band is the limited link budget resulting from high path loss during radio propagation. On the one hand, it is preferable to employ directional antennas for high-speed point-to-point data transmission. On the other hand, a directional antenna pattern covering a wide range of angles to give omni-directional coverage is usually employed to aid in neighbor discovery and beam-steering decisions. Selection of the control channel is a crucial factor of the system design. For an in-band (IB) 60 GHz control channel, the devices may fail to communicate with each other if they move apart or the link quality degrades.

Thus, a strong need exists for techniques to improve wireless personal area networks, especially those operable at the millimeter wave frequencies.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
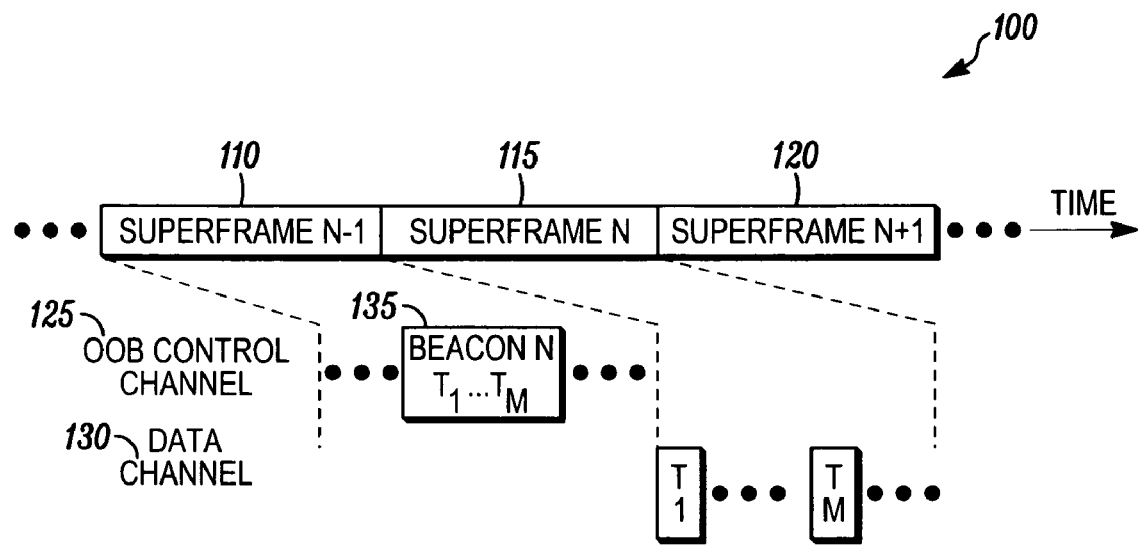
FIG. 1 illustrates a proposed neighbor discovery mechanism in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

An embodiment of the present invention provides a 60 GHz system where a lower band channel (for example, but not limited to, IEEE 802.11 WLAN in 2.4 GHz or 5 GHz bands or WiMedia UWB in 6 GHz band) is used as an out-of-band (OOB) control channel. It is assumed that the system supports concurrent operation of the data and control channels. Channel time may be divided into super-frames, which form the basic timing division for Time Division Multiple Access (TDMA) technology.

Looking now at FIG. 1, generally as 100 an embodiment of the present invention provides a method in which the beacon transmitted by the wireless personal area network (WPAN) coordinator on the control channel 125 specifies the time slots and the order in which devices transmit their omni-directional training sequences on the data channel 130 at the beginning of the next super-frame 110, 115 and 120. Continuing with FIG. 1 is the neighbor location discovery, where the WPAN contains m devices. In this way, the devices map the neighbors' locations by listening to the training sequence transmissions. A device is capable of associating a transmission with a specific neighbor device using the order specified in the beacon frame 135. Alternatively, if there is no coordinator, then devices may agree on a specific order of training sequence transmissions in a distributed way by negotiating it on the out-of-band (OOB) control channel 125. The beacon(s) can be also transmitted on the data channel 130 before the training sequence transmissions. The obtained information is necessary for transmission beam-forming as well as for reception to silence interferers.

Figure 2:
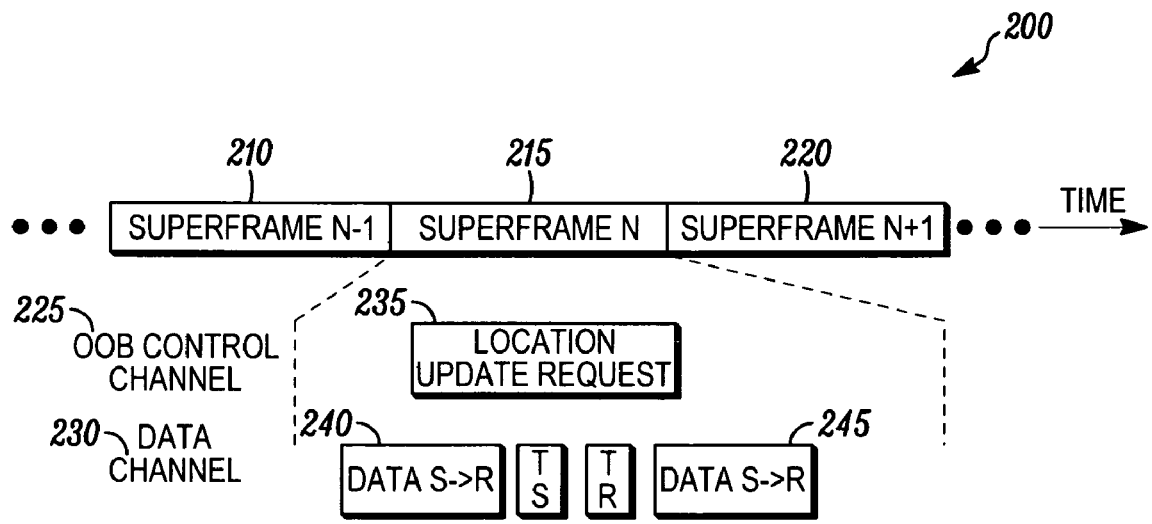
FIG. 2 demonstrates a neighbor location update operation of an embodiment of the present invention.

Turning now to FIG. 2 at 200 is an embodiment of the present invention which provides a scheme to dynamically update the neighbor location and perform beam re-steering, which may be necessary when high packet loss is experienced during directional data transmission or reception due to device mobility or rotation. Either the sender or the receiver may ask its counterpart to perform location update 235 using a frame sent through the OOB control channel 225. Superframe n−1 is shown at 210, superframe n at 215 and superframe n+1 is illustrated at 220. Then the sender stops the data transmission and both devices transmit omni-directional training sequences in a pre-defined order. The sender and the receiver can also negotiate on OOB channel 225 to set up a pre-determined or periodic schedule for location update on data channel 230 where they send training sequences in a pre-defined order. Finally, the data transmission may be resumed with updated beam steering parameters.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. A method, comprising:
   using a lower band out-of-band (OOB) control channel to specify time slots and an order in which to transmit omni-directional training sequences on a data channel at a beginning of a next super-frame used in a wireless personal area network (WPAN) to operate in a 60 GHz band, wherein the lower band out-of-band (OOB) control channel uses a frequency band below the 60 GHz band;
   wherein by listening to the omni-directional training sequence transmissions and using an order specified in a beacon frame, a locate update request is performed;
   sending location information for a device in communication with the WPAN, wherein the location information is communicated using the lower band OOB control channel to communicate the location information; and
   performing beam re-steering for data transmitted from the WPAN to the device in the 60 GHz band based on the location information.

2. The method of claim 1, further comprising transmitting the beacon frame on the data channel before the training sequence transmissions.

3. The method of claim 1, wherein the lower band OOB control channel uses at least one of a 2.4 GHz and a 5 GHz frequency band.

4. The method of claim 1, wherein the lower band OOB control channel uses an Institute for Electrical and Electronic Engineers (IEEE) 802.11 frequency band.

5. The method of claim 1, wherein the lower band OOB control channel uses a frequency band wherein the signal is substantially less attenuated by oxygen absorption than is the 60 GHz band.

6. The method of claim 1, wherein the lower band OOB control channel uses a frequency band wherein the signal is substantially less attenuated by obstructions than is the 60 GHz band.

7. A method, comprising:
   agreeing on a specific order of omni-directional training sequence transmissions in a distributed way by negotiating the specific order on a lower band out-of-band (OOB) control channel in a wireless personal area network (WPAN) operable in a 60 GHz band, wherein the lower band out-of-band (OOB) control channel uses a frequency band below the 60 GHz band; and
   performing a locate update request by listening to the omni-directional training sequence transmissions and using an order specified in a beacon frame, which further comprises:
      sending location information for a device in communication with the WPAN, wherein the location information is communicated using the lower band OOB control channel to communicate the location information; and
      performing beam re-steering for data transmitted from the WPAN to the device in the 60 GHz band on the location information.

8. The method of claim 7, wherein the lower band OOB control channel uses at least one of a 2.4 GHz and a 5 GHz frequency band.

9. The method of claim 7, wherein the lower band OOB control channel uses an Institute for Electrical and Electronic Engineers (IEEE) 802.11 frequency band.

10. The method of claim 7, wherein agreeing on a specific order of omni-directional training sequence transmissions is between at least two wireless devices.

* * * * *

UNITED STATES PATENT AND TRADEMARK OFFICE
CERTIFICATE OF CORRECTION

| | |
|---|---|
| PATENT NO. | : 8,379,560 B2 |
| APPLICATION NO. | : 12/044132 |
| DATED | : February 19, 2013 |
| INVENTOR(S) | : Kesselman et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this
Thirtieth Day of September, 2014

Michelle K. Lee
*Deputy Director of the United States Patent and Trademark Office*